(12) United States Patent
Blume et al.

(10) Patent No.: US 8,706,474 B2
(45) Date of Patent: Apr. 22, 2014

(54) TRANSLATION OF ENTITY NAMES BASED ON SOURCE DOCUMENT PUBLICATION DATE, AND FREQUENCY AND CO-OCCURRENCE OF THE ENTITY NAMES

(75) Inventors: Matthias Blume, San Diego, CA (US);
Dayne B. Freitag, La Mesa, CA (US);
Zhiqiang Wang, San Diego, CA (US)

(73) Assignee: Fair Isaac Corporation, San Jose, CA (US)

( * ) Notice: Subject to any disclaimer, the term of this patent is extended or adjusted under 35 U.S.C. 154(b) by 1455 days.

(21) Appl. No.: 12/110,231

(22) Filed: Apr. 25, 2008

(65) Prior Publication Data

US 2009/0319257 A1    Dec. 24, 2009

Related U.S. Application Data

(60) Provisional application No. 61/030,944, filed on Feb. 23, 2008.

(51) Int. Cl.
*G06F 17/28* (2006.01)
(52) U.S. Cl.
CPC .......... *G06F 17/289* (2013.01); *G06F 17/2872* (2013.01)
USPC ...................................... 704/7; 704/2; 704/5

(58) Field of Classification Search
CPC ........................... G06F 17/289; G06F 17/2872
USPC ...................................... 704/2, 5, 7
See application file for complete search history.

(56) References Cited

U.S. PATENT DOCUMENTS

| | | | |
|---|---|---|---|
| 5,161,105 A * | 11/1992 | Kugimiya et al. | 704/4 |
| 7,359,849 B2 * | 4/2008 | Palmquist | 704/5 |
| 2009/0070095 A1 * | 3/2009 | Gao | 704/2 |

* cited by examiner

*Primary Examiner* — Farzad Kazeminezhad
(74) *Attorney, Agent, or Firm* — Mintz Levin Cohn Ferris Glovsky and Popeo, P.C.

(57) ABSTRACT

Methods and apparatus, including computer program products, related to entity name translation. In general, a set of data records including one or more names of one or more entities in a source language is received and candidate translations are generated for the names of the data records. The candidate translations are strings of characters in a target language that has a different orthography than an orthography of the source language. A data repository is queried for records matching the candidate translations. A translation of at least one of the candidate translations is selected based on a comparison of a combination of candidate translations and properties of the source record comprising of the publication date, entity name co-occurrence and their frequency with the result of the querying the data repository.

20 Claims, 4 Drawing Sheets

| | 302 | 304 | 306 | 308 300 | 310 | 312 | 314 | 316 |
|---|---|---|---|---|---|---|---|---|
| | Source characters | Pinyin | LDC dictionary nearest names | LDC dictionary translation | Full name match | PTED scores | Ground truth | Finding |
| 318 | 乔治 · 桑塔亚纳 | qiao zhi · sang ta ya na | 乔治 | Deopde Deordij Deordije Djeordje Djeordijj Djeordije Djordji Djordijj Djordjje Dorde Dordi Dordij Dordije George Georges Georgio Georgy Giorgi Giorgio Giorgos Giorgy Jioje Jioj Zhorzh Zhorzhi | - | zhorzh=18.501 george=17.627 georgy=17.541 giorgii=17.184 georges=14.979 jioje=13.463 giorgio=13.091 | George Santayana (?) | The name is not in a given full name dictionary and PTED does not rank "george" highest. The name is translated correctly anyway. |
| 320 | 赫尔姆特 · 施密特 | he er mu te · shi mi te | 赫尔姆, 赫尔穆特 | Helm Herm, Hellmut Hellmuth Helmut Helmute Helmuth Hermuth Khelmutkh | helmut schmidt | helmuth=20.534 helmut=20.395 | Helmut Schmidt (?) | The string used in this source to represent "Helmut" is not in the LDC dictionary and PTED does not rank the correct translation highest. The name is translated correctly anyway. |
| 322 | (律师) 詹利 · 雷兹尼克 | zhan li · lei zi ni ke | | | | amri = 24.11 obry = 23.09 zeri = 22.57 hemri = 20.82 henry = 20.00 genri = 19.82 reznek = 28.31 rezek = 26.40 linic = 25.24 riziq = 23.95 ryshich = 23.25 | (lawyer) Genri Reznik | Although low PTED scores, use of context brought about correct translation |

# TRANSLATION OF ENTITY NAMES BASED ON SOURCE DOCUMENT PUBLICATION DATE, AND FREQUENCY AND CO-OCCURRENCE OF THE ENTITY NAMES

CROSS REFERENCE TO RELATED APPLICATION

This application claims the benefit of U.S. Provisional Patent Application entitled "TRANSLATION OF ENTITY NAMES", filed Feb. 23, 2008 and assigned Application Ser. No. 61/030,944, the contents of which are hereby fully incorporated by reference.

GOVERNMENT LICENSE RIGHTS

Subject matter of this disclosure was made with Government support under contract No.: HR0011-06-C-0023 awarded by Defense Advanced Research Projects Agency (DARPA). The Government may have certain rights in the claimed subject matter.

BACKGROUND

The present disclosure relates to data processing by means of a digital computer, and more particularly to translation of entity names.

In general, documents may be translated from a first human, written language to a second human, written language using machine translation. For example, a document written in a form of written Chinese, such as simplified Chinese, may be translated by a machine translation system, which may include a computer system running machine translation software, to another language such as written English. Translation from one language to another may involve various techniques. For example, simplified Chinese characters may be translated with the use of a simplified Chinese to English dictionary, where strings of Chinese characters may be looked up and their English counterpart may be used as part of a translation.

SUMMARY

The subject matter disclosed herein provides methods and apparatus, including computer program products, that implement techniques related to translation of entity names.

In one aspect, a set of data records including one or more names of one or more entities in a source language is received and candidate translations are generated for the names of the data records. The candidate translations are strings of characters in a target language that has a different orthography than an orthography of the source language. A data repository is queried for records matching the candidate translations. A translation of at least one of the names is selected from the candidate translations based on a comparison of a combination of candidate translations and properties of the source record with the result of the querying the data repository.

In an interrelated aspect, one or more tokens generated from a source document in a source language are received. One or more candidate translations are generated for the tokens, where the candidate translations are strings of characters in a target language that has a different orthography than an orthography of the source language. A data repository is queried for records matching the candidate translations. One of the candidate translations is selected as a translation of the one or more tokens based on a comparison of a combination of candidate translations and properties of the source document with the result of the querying the data repository.

In an interrelated aspect, one or more tokens generated from a source document in a source language are received. One or more candidate translations are generated for the tokens, where the candidate translations are strings of characters in a target language that has a different orthography than an orthography of the source language. Generating the candidate translations includes applying a trained sequence alignment model to a transliteration of one or more of the tokens to generate at least some of the candidate translations. A data repository is queried for records matching the candidate translations, where the records include properties of terms in the target language, the properties of the terms derived from an extraction of the terms from documents in the target language. One of the candidate translations is selected as a translation of the one or more tokens based on a comparison of a combination of candidate translations and properties of the source document with the result of the querying the data repository.

In an interrelated aspect, a character sequence alignment model may be trained, where the model may be applied to generate candidate translations and scores associated with the candidate translations, and the scores and properties of candidate translations are to be compared with properties of an entity name in a source document to select a candidate translation as a translation of the entity name. The scores associated with the candidate translations may be affinity scores indicating a likelihood of a candidate translation being a good translation.

The subject matter may be implemented as, for example, computer program products (e.g., as source code or compiled code tangibly embodied in computer-readable storage media), computer-implemented methods, and systems.

Variations may include one or more of the following features.

An entity may be a person, location, or organization.

A set of data records may be received by performing information extraction including named entity recognition on a set of source language documents.

There may be a cardinality of one data record per distinct entity name in each source document, a cardinality of one data record for each occurrence of an entity name in a source document, another cardinality of data records per entity names, or some mix of cardinalities. Within-document co-reference resolution may be carried out and there may be a cardinality of one data record per distinct entity per source document. Cross-document entity disambiguation may be carried out and there may be a cardinality of one data record per distinct entity found in a set of source language documents. Within-document co-reference resolution and cross-document entity disambiguation may be carried out for documents in the source language, and there may exist a cardinality of one record for an entity name per multiple occurrences in a document and across documents.

Fields of each data record may include context items of a source entity including one or more of: titles; co-occurring entity names; co-occurring terms; relations; dates or date ranges mentioned in the documents; creation or publication dates of the documents; document topics; or document classification.

Candidate translations may be generated based on character-level transliteration, based on a transliteration model, based on look-up in a translation table, or a combination of techniques. Candidate translations may be generated by treating each set of characters that is recognized as an entity from a source document as a single string of characters. Candidate translations may be generated by tokenizing a set of characters that is recognized as an entity into multiple consecutive strings of characters, where each token may correspond to a name component (e.g., a word) in the target language. Candidate translations may be generated by considering more than one possible tokenization of a set of characters that is recognized as an entity from a source document.

A transliteration model may be trained in a supervised fashion on a set of corresponding transliterated string pairs from the source and target languages. A transliteration model may be a character sequence alignment model based on an average perceptron, based on a standard perceptron, based on a voted perceptron, based on a kernel method, or based on a hidden Markov model.

Candidate translations may be in a normalized form of the target language (e.g., apostrophes may be removed, middle initials may be removed, and the like). A normalization may be defined by a many-to-one mapping such as Soundex, NYSIIS (New York State Identification and Intelligence System), or Metaphone.

A data repository of target language information may be generated by performing information extraction including named entity recognition on a set of target language documents. There may be a cardinality of one data repository record per distinct entity name. Within-document co-reference resolution may be carried out and there may be a cardinality of one data record per distinct entity found in each target language document. Cross-document entity disambiguation may be carried out and there may be a cardinality of one data record per distinct entity found in a set of target language documents, in the data repository. Within-document co-reference resolution and cross-document entity disambiguation may be carried out for documents in the target language that are to be extracted to a data repository, and there may exist a cardinality of one record for an entity name per multiple occurrences in a document and across documents.

Fields of each data record for a repository of information extracted from target language documents may include context items of the entity which may include one or more of: titles; co-occurring entity names; co-occurring terms; relations; dates or date ranges mentioned in the documents; creation or publication dates of the documents; document topics; or document classification.

Querying a data repository may be based on exact matching of candidate translations of source entity names; based on exact matching of normalized candidate translations and normalized target language names, where the normalization may involve removing optional name components such as prefixes, middle names and initials, and suffixes, application of a phonetic algorithm, or both; or some combination of exact matching and normalization.

Selecting a translation of an entity name as a translation may be based on similarity of a candidate translation and a target language name; similarity of sets of target language context items and candidate translations of source language context items, and document frequency of the target language name. A similarity of a candidate translation and target language name may discount missing name components that are optional and measures similarity token-by-token. Token-by-token similarity may be based on character-level transliteration, based on a transliteration model, based on look-up in a translation table, or matching abbreviations against long forms of names. A similarity of sets of target language context items and candidate translations of source language context items may utilize a weight of evidence of each context item that is computed from the statistics of the source and target language data records.

Named entity recognition of characters in a source document may be performed to generate a set of characters expected to represent an entity. The set of characters may be tokenized to generate one or more tokens. One or more tokenizations may be generated.

Text may be extracted from documents in the target language to populate a data repository with records. A character sequence alignment model may be trained, where the model may be used to generate at least some of the candidate translations and edit distance scores for the at least some of the candidate translations.

Training a character sequence alignment model may include filtering a list of corresponding source/target name token pairs to keep only transliterated (as opposed to translated by meaning) pairs and utilizing the result to train the character sequence alignment model.

Generating one or more candidate translations may include applying tokens of a source language to the character sequence alignment model to generate at least some of the candidate translations.

Properties of a source document may include properties indicating a co-occurrence of terms; a date or date range of source document; and a topic or document classification.

A translation may be stored as part of a translation of a source document.

Orthographies of first and target languages may have respective sets of characters that are substantially not overlapping.

A comparison of a property of a candidate translation from a source document with properties of the candidate translation derived from a target language corpus of texts may be only one of several factors in selecting a translation.

The subject matter described herein can be implemented to realize one or more of the following advantages. Entity names may be accurately translated such that entities such as persons, locations, and organizations may be accurately represented and understood in a translated text. The translation may be performed in accordance with an annotate then translate technique, which may improve performance and accuracy of translations. The technique may be referred to as annotate then translate because entity names may be extracted from a source language document and annotated as such (which, e.g., may reserve a context of source language text surrounding the entities) before attempts to translate the names, rather than performing a machine translation of the document before performing named entity recognition, and such an approach may provide for better accuracy. For example, the former, annotate then translate, solution is at least considered more unique due to the 2007 Automatic Content Extraction-Entity Translation (ACE-ET) evaluation where at least eight teams, including industry leaders, used the latter solution, and the former was more accurate by some measures. Accurate translation of entity names may assist with searching of translated text when a desired search term is an entity name. When added to other machine translation systems, an accurate entity translation capability may make it possible for anyone to make sense of text regardless of the language in which it was originally written, tearing down human language barriers. The capability may have applicability in text search, decision management (e.g., for deployments requiring translation of entity names), part identification, and the like.

Details of one or more implementations are set forth in the accompanying drawings and in the description below. Further features, aspects, and advantages will become apparent from the description, the drawings, and the claims.

DETAILED DESCRIPTION

In general, the descriptions of FIGS. 1-4 are related to entity name translation. Entity name translation, which may also be referred to as "entity translation", may be considered a process of translating entity names from one human language to another, where a language of a source document to be translated may be referred to as a source language and a language of a target document that is to be a result of a translation may be referred to as a target language. Entity translation may be accomplished via an identity mapping when the two languages use a same script (and, e.g., have a substantially overlapping set of characters in their respective orthographies), and may be more complex when the scripts of a source and target language differ (e.g., Arabic vs. Chinese vs. English). Entity names may include words that are difficult to translate and considered out of vocabulary, such as names of persons, locations, and organizations.

Entity name translation may be a focus of machine translation due, in part, to limitations of some machine translation systems. For example, some machine translation systems may have output that is comfortably readable. However, when translating between languages, including languages with different scripts, such as Arabic, Chinese, and English, the output might not be as useful as may be desired. This may be due, in part, to entity names not being translated correctly (e.g., not translated to an understood representation in a target translation language). Because many entity names may be translated incorrectly, readers may be able to understand what a translated document is about, but not who the players that are mentioned in the translated document are. As an example of ambiguity that may result from translating entity names, FIG. 1A includes a Chinese-language character string 110 which may be ambiguously translated to either of the English-language entity names Henry Lesnick or Genri Reznik. Entity names may constitute a small fraction of the words in any document, but a large fraction of the vocabulary required to correctly translate documents.

Accurate entity translation, (e.g., via cross-language person name normalization and disambiguation) may improve an ability to retrieve information from foreign text. For example, a name of Finnish race car driver in the Finnish alphabet is Kimi Räikkönen. A standard Arabic/English machine translation system translated the name of this person occurring in a document written in the Arabic alphabet to "Kimi Raykunin" in the English language. Following that example, a query for a standard English spelling that is "Kimi Raikkonen" may fail to match the transliterated result. However, cross-language person name normalization and disambiguation may correctly generate a translated document with the standard English spelling. Thus, a query for Raikkonen may successfully retrieve an Arabic document that includes an Arabic-scripted version of the name.

The examples discussed with regard to FIGS. 1-4 includes descriptions of entity name translation mechanisms, techniques, or both that include a sequence alignment model based on the averaged perceptron (a learned edit distance model for fuzzy matching) followed by a comparison of contexts between the source document and an English corpus that resolves which of many possible translations is correct. Accuracy of translations according to an implementation has been tested to be greater than 90 percent. While some examples are described with reference to Chinese language script being translated to English language entity names (such that Chinese is a source language and English is a target language), implementations may involve other source and target languages, and different languages may have orthographies with sets of characters that substantially overlap (e.g., Finnish entity names may be translated to English entity names). Also, while strings of characters tend to have multiple characters in the examples shown, a string may have one or more characters. Also, while a certain number and type of databases are shown, alternatives may have fewer or additional databases, or different types of data repositories.

In general, an example entity name translation system may be viewed as having two stages, including a first stage involving extracting text from target language documents and training a character sequence alignment model, such as an edit distance model; and a second stage involving determining translation candidates and selecting a translation from the translation candidates. The first stage may be performed once prior to analysis of source documents to be translated (and, e.g., performed routinely to update a database related to the extracted text); whereas the second stage may be performed each time a new source document is desired to be translated. The first and second stages may be performed by separate components (e.g., separate hardware, software, or both) or a same component or set of components.

The first stage may involve one or more of the following:

collecting English (target language) text (including document date (e.g., date of publication), topic, source, entity names, titles (e.g., a title of an entity, such as corporation, lawyer, prime minister, and the like), and the like) (e.g., this may involve populating a database with records representing tokens of entities (or strings of characters for entities) and their properties, such as a record George Bush which may have information indicating the title of president of the United States has been found ten times and in ten instances was found in articles starting in the year 2001; the text may be collected from a corpus of documents, such as an archive of NEW YORK TIMES newspaper articles; the database may be populated with normalized versions of names (e.g., normalizing names in accordance with a phonetic algorithm (e.g., Soundex or Metaphone), or cultural conventions (e.g., English middle names may be removed or tagged as an optional characteristic))); and training an edit distance model, which may involve character-level transliteration (e.g. use of Pinyin or, in implementations, Buckwalter) to English (e.g. the Chinese character string 130 of FIG. 1C may be transliterated to "lei zi ni ke" where the character string may represent "reznik") and may involve normalized versions of names (e.g., training based on a pair of a name in the source language and a normalized name in the target language).

Figure 1A:
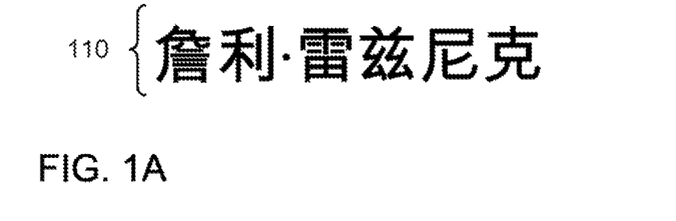
FIGS. 1A-1C include character strings that may be in accordance with a form of the Chinese language.
Figure 1B:
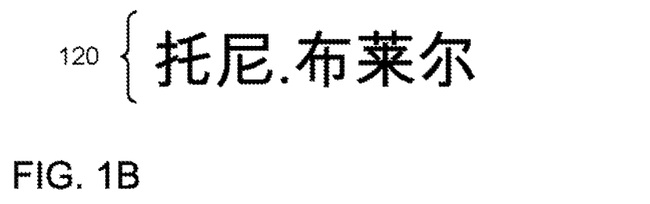
Figure 1C:
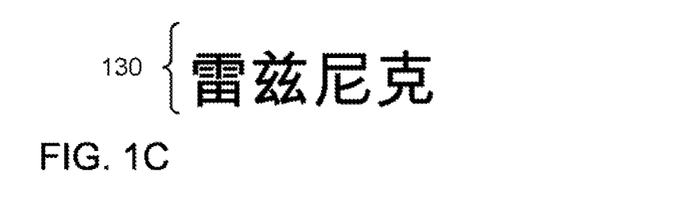

The second stage may involve one or more of the following:

named entity recognition (NER) (e.g., determining that certain strings of characters in a source document are entities), tokenization (e.g., determining which atomic units into which to break a string of characters from a source document; e.g., for a source document in the English language a token may be a word that is separated from other words by white space, whereas in Chinese language documents conventions for determining tokens may differ), and within-document co-reference resolution in the source language (e.g., a system may support multiple candidate tokenizations of each string, e.g. the character string of FIG. 1C may be a single name token ("Reznik") or multiple name tokens ("Reza Nike"));

cross-document entity disambiguation within a source and/or target language corpora (which need not be performed; cross-document entity disambiguation is described, in part, in U.S. patent application Ser. No. 11/234,692, which is incorporated by reference);

candidate translations determination for each source token (e.g., generating a list of candidate translations in the target language that are considered to be possible translations from the source language to the target language; results from determining candidate translations may be cached rather than re-computed for identical or similar mentions; e.g., later in a same source document; candidate translations may be determined in accordance with one or more of character-level transliterations, dictionaries, and fuzzy matching based on application of an edit distance model; candidate translations may be normalized, e.g., according to Soundex or Metaphone to reduce a number of candidates);

selection of "quick and dirty" best guess (or guesses) translations of names, including titles, from the source to the target language (a lot of these may be inaccurate, but that may be acceptable as their use may be helpful for the next step); and selection of a candidate translation as a best match based on a comparison of (translated) attributes and contexts between pairs of records from the source and target corpora (e.g., which may involve querying a database for properties of a token extracted from an English corpus (e.g., properties of a token determined in the collecting process described above) and then comparing those properties with properties of the entity in the source document to be translated), where the comparison may involve engineered distance measures (in variations learning (rather than engineering) the distance measures may be used), where distance measures provide scores, so a threshold may indicate "can't find a match" (use of the best guess or guesses may assist with generating a smaller list of candidate translations for which to generate comparisons with a target language corpus, which may in turn reduce an amount of computational overhead) (selection may involve selecting a candidate considered a "match" as compared to a candidate considered a "no match"; there may be multiple names (e.g. "Michael Glenn" and "Glenn") per record that must be translated; selecting a best translation in cases where there was no match may be based on token-level translations and frequency information).

Figure 2:
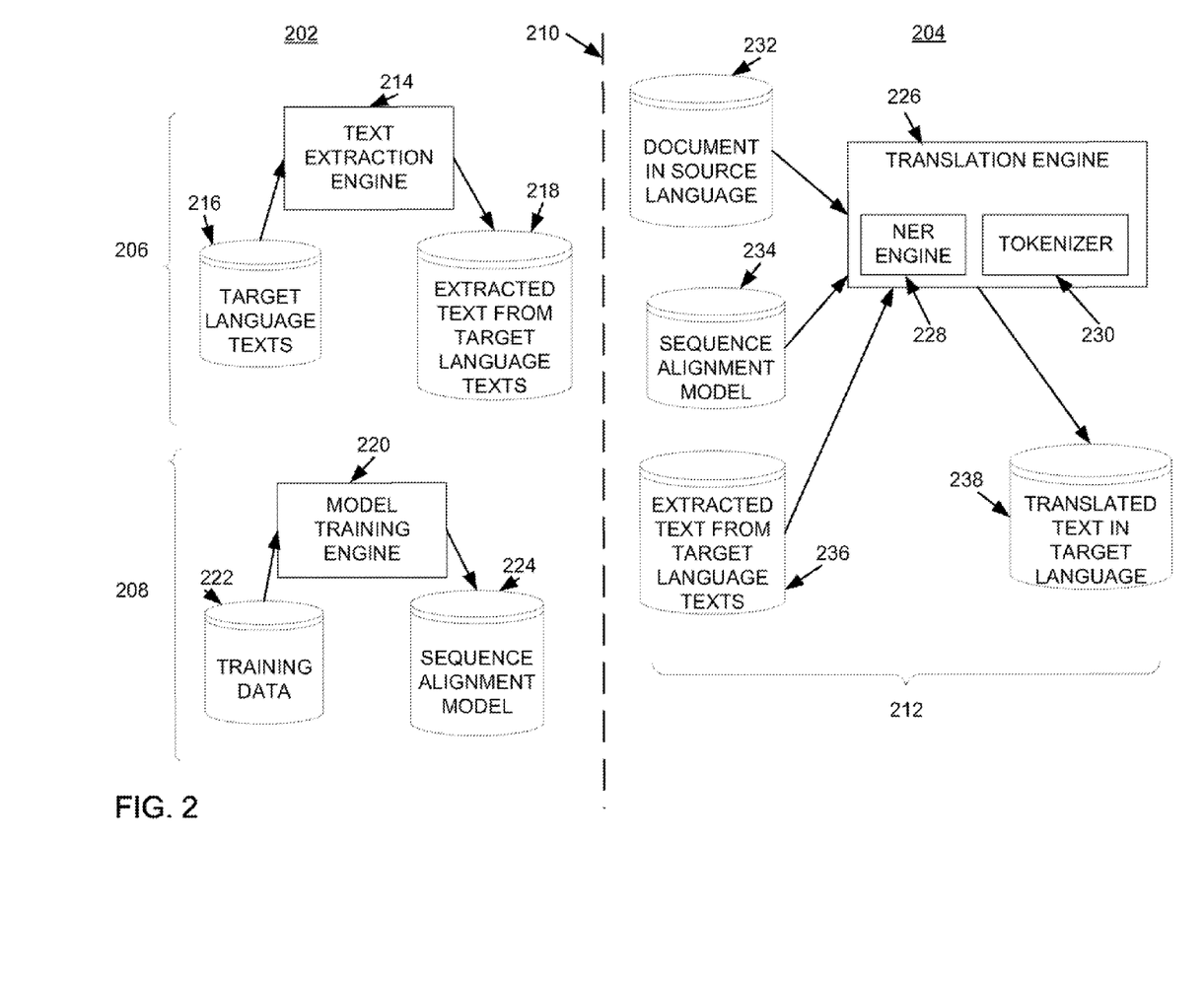
FIG. 2 is a diagram of systems to generate resources to translate entity names and a system to translate entity names.

FIG. 2 is a diagram of systems to generate resources for translation of entity names and a system to translate entity names. In general, the diagram of FIG. 2 may perform the two stages discussed above with a first portion 202 of the diagram performing the first stage, in which a first system 206 may extract text to populate a database of extracted text and a second system 208 may generate a model based on training data, and with a second portion 204 of the diagram performing the second stage, in which a third system 212 may translate entity names based on a sequence alignment model, a document in a source language, and a database of text extracted from target language texts (e.g., by performing NER, performing tokenization, generating candidate translations, and selecting a candidate translation). The dashed line 210 may represent a separation between the two stages, and the line 210 may further represent that components of the first portion 202 may be located separately from components in the second portion 204.

The first system 206 includes a text extraction engine 214, a database of target language texts 216, and a database of extracted text 218. In the first system 206, the text extraction engine 214 may extract text from the target language texts 216 to populate the database of extracted text 218. The target language texts 216 may be any type of documents that are in a target language, which is a language into which a text is to be translated. For example, if a translation engine 226 was to use the database of extracted text 218 to perform a simplified Chinese to English translation of an entity name, the target language would be English. As an example, the database of target language texts 216 may store NEW YORK TIMES COMPANY'S NEW YORK TIMES newspaper articles in the English language. The database of target language texts 216 may be referred to as a corpus of target language texts. Documents in the database of target language texts may be from a variety of sources, such as broadcast news programs, newspapers, newswire reports, internet sources (e.g., blogs, news sources), from transcribed audio (e.g., transcriptions of National Public Radio broadcasts), from a database of geographical information, from white page directory, from organization charts, and the like.

Extraction of text from the target language texts may include parsing of text to identify types of terms. For example, a document's date, topic (e.g., taken from a document title or derived from the document text), source (e.g., an author or publisher), entity names in a document, titles of entities (e.g., president, city, county, state, lake, river, ocean, sea, mountain, street, highway, lawyer, vice president of marketing, corporation, limited liability partnership, and the like), and the like may all be extracted from a document and identified as such. For example, the name "Walter Cronkite" may be extracted from a document along with a title "newscaster."

Populating the database of extracted text 218 may include generating records, altering records, and the like. Records of the database may use entity names as a key figure (which might be normalized according to a many-to-one mapping, such as Soundex) and other properties in a record may be properties associated with an entity name. For example, a record may contain the entity name "Cronkite," a property newscaster with an observed number of associations (e.g., a property indicating that in 38 occurrences a Cronkite entity name was associated with (e.g., within a number of words of or in the same document as) a title newscaster), a property indicating a co-occurrence of terms with the term "Walter" (e.g., terms that occur near each other; a property indicating 53 occurrences of the term Cronkite occurring adjacent to Walter), a property indicating a topic of "newscasting" with a number of observed associations (e.g., a property indicating 14 instances where an article with the name "Cronkite" is about newscasting), and the like. Thus, the database may include counts to reflect observations and may further include, or alternatively include, properties to indicate an existence or non-existence of an association of properties. A cardinality of records to a set of documents may be one record per an entity name per a set of documents. The cardinality may be based on what is computed to be a same underlying entity, which may be based on, for example, within-document co-reference resolution and cross-document entity disambiguation (which may be more precise than one record per an entity name as variations of entity names may be allowed such that, for example, optional entity name components, such as a prefix, middle name, or suffix, such that mentions of Bill Clinton and Bill Jefferson Clinton would be associated with a same record).

The second system 208 includes a model training engine 220, training data 222, and a sequence alignment model 224. In general, the second system 208 may operate by having the model training engine 220 take as input training data 222 to generate, alter, or both the sequence alignment model 224. The training data 222 may be example pairs of transliterated entity names that originated from a source language and are in a target language, and their actual target language counter part. For example, if the third system 212 is to translate entity names from simplified Chinese characters to English language entity names, the training data may be transliterated simplified Chinese characters according to Pinyin and their actual English language counterpart. Because a Pinyin transliteration may reflect a phonetic interpretation of simplified Chinese characters that does not have a one to one correspondence to a recognized written English counterpart, a transliteration of a simplified Chinese entity name may differ substantially from its actual English language counterpart (e.g., a written English-language counterpart most commonly associated with an entity). The model training engine 220 may interpret these differences, if any, to determine how to generate, alter, or both the sequence alignment model 224. The training pairs in the training data 222 may include entity names in the source language and normalized target language names (e.g., based on application of many-to-one mapping using a phonetic algorithm, such as Soundex).

The sequence alignment model 224 may be a supervised model based on an average perceptron, a supervised model based on a standard perceptron, a supervised model based on a voted perceptron, a supervised model based on a kernel method, or any other similar model. For example, the sequence alignment model 224 may be a supervised, edit-distance model based on the averaged perceptron. Application of the sequence alignment model 224 may involve the use of fuzzy matching. The sequence alignment model 224 may be a Markov model that may be thought of as a finite state automaton with probabilities added between state transitions. The model may be stored in a data repository, such as a database and the model may be applied by querying the model based on an input sequence (e.g., a transliterated entity name in a target language).

For an example system, a sequence alignment model was trained based on an averaged perceptron (see, e.g., Michael Collins. Discriminative Training Methods for Hidden Markov Models: Theory and Experiments with Perceptron Algorithms. EMNLP (2002), which is incorporated by reference and describes training a model based on an averaged perceptron) using as training samples a list of corresponding Pinyin/English name token pairs, where the names were non-Chinese person names. For each training pair, an indicated English rendering may constitute a true target (t) and a current model may be used to generate an alternate string (t'), and the model may be updated in the event t' yields a higher score than t. This training was repeated for ten epochs with a model of order of three. The model is described in D. Freitag, S. Khadivi, A Sequence Alignment Model Based on the Averaged Perceptron, EMNLP (2007), which is incorporated by reference. See, also, F, Huang, S, Vogel, A. Waibel, Improving Named Entity Translation Combining Phonetic and Semantic Similarities, HLT-NAACL (2004); K. Knight, J. Graehl, Machine Transliteration, Computational Linguistics (1997); and C.-J. Lee, J. Chang, Acquisition of English-Chinese Transliterated Word Pairs from Parallel-Aligned Texts Using a Statistical Machine Transliteration Model, HLT-NAACL (2003) (all of which are incorporated by reference). The model described in Freitag et al. is trained based on the following technique described in pseudo code, where the number in angle brackets ("<", ">") represents a line number:

<1>: Given a set S of source sequences
<2>: V←[ ], an empty list
<3>: α←0, a weight vector
<4>: for some number of iterations do
<5>: for s in S do
<6>: Pick t, t'; t', t having higher affinity with s
<7>: <e, v←$A_\alpha$(s, t)
<8>: <e', v'←$A_\alpha$(s, t')
<9>: if v'≥v then
<10>: α←α+φ(s, t, e)−φ(s, t', e')
<11>: end if
<12>: Append α to V
<13>: end for
<14>: end for
<15>: Return the mean α from V In that technique, V may be a list of α's; α may be a weight vector that is a model parameterization; e may be an edit sequence that has elements being character pairs <$c_s$, $c_t$>, with $c_s$ being within the sum of all sequences s in union with the empty set and $c_t$ being within the sum of all sequences t in union with the empty set; v may be an edit score; $A_\alpha$ may be an affinity function under model parameters α where $A_\alpha$(s, t) may represent an optimal edit sequence e with score v given input sequences s and t; s may be an input sequence representing a source language transliteration (e.g., Pinyin); t may be an input sequence representing a target language target result; t' may be an input sequence that may have one or more alterations to the sequence t; $A_\alpha$(s, t') may represent an optimal edit sequence e' with score v' given input sequences s and t' (i.e., a same source sequence but potentially a different target sequence than $A_\alpha$(s, t), which may be calculated using a standard edit distance function); φ(s, t, e) may represent a feature vector, having the same dimensionality as α for a source, target, and corresponding edit sequence s, t, and e, where the feature vector is the sum of feature vectors at each point in e as it is played out along input sequences s and t; and φ(s, t', e') may represent a feature vector, having the same dimensionality as α for a source, target, and corresponding edit sequence s, t', and e', where the feature vector is the sum of feature vectors at each point in e' as it is played out along input sequences s and t'.

Selection of t and t' may be in accordance with one of four settings, which may depend on an application of the training. In particular, where source and target strings inhabit a same set of strings, the application may be considered an affinity application; otherwise, the application may be considered a transduction application. For each of those applications there may be sub-applications such that there is a total of four possible application/sub-application pairs. For the four possibilities of applications and sub-applications, selection in accordance with an affinity/ranking application may involve a situation where only some of the target sequences can be measured according to their affinity with a source sequence and be in accordance with ordering a sample of the target sequences according to the partial order, and letting t and t' be two sequences from this order, such that t is ordered higher than t'; selection in accordance with an affinity/classification application may involve an ability to group sequences into classes and may be in accordance with, for each s, sample t from among its co-members and sample t' from among the members of other classes; selection in accordance with a transduction/ranking application may involve data presented as source-target pairs where each t is a transduction of a corresponding s and there is a desire to learn a model which, given a novel s, will enable ranking candidate transductions, and the selection may be in accordance with, given s, let t be the target sequence provided and sample t' from among the other target sequences; and selection in accordance with a transduction/generation application may involve source-target pairs and a desire to learn to generate a probable target string given a novel source string, and the selection may be in accordance with generating a t' that is approximately optimal according to a current model.

The example technique described in pseudo code starts with a zero parameter vector and involves iteration through the collection of source sequences s (line 5). For each sequence, two target sequences having unequal affinity with the source sequence are "picked" (line 6; see also above applications/sub-applications). For the target sequences, scores are computed for each (lines 7 and 8). If the scores returned by a current model agree with an ordering where t has a greater affinity to s than an affinity of t' to s, nothing is performed. Otherwise, the model is updated using the perceptron training rule of line 10. Ultimately, a averaged over all data point presentations is returned.

Returning to FIG. 2, the third system 212 may be used to generate translations of entity names. The third system 212 includes the translation engine 226, a document 232 in a source language, a sequence alignment model 234, a database of extracted text 236, and translated text 238. In general, the third system 212 may operate by taking as input the document 232 in a source language; finding, in the document, an entity represented by a string of characters in a source language with a NER engine 228; tokenizing a string of characters recognized as an entity to one or more tokens in accordance with one or more tokenizations with a tokenizer 230; generating candidate translations for the tokens by one or more techniques, including a technique of applying the sequence alignment model 234 to generate one or more candidate translations; querying the database of extracted text 236 for properties of one or more candidate translations, if any, that were extracted from texts in the target language; and selecting a candidate translation as a translation of a recognized entity name based on a comparison of properties of the candidate translations and properties of the document 232 in the source language.

Components of the third system 212 that have similar names to components of the first and second systems 206, 208 may be derived from those systems. For example, the sequence alignment model 234 of the third system 212 may be a copy of the sequence alignment model 224 generated by the second system 208. As another example, the database of extracted text 236 of the third system 212 may be a copy of the database of extracted text 218 populated by the first system 206.

Use of the sequence alignment model 234 may involve ranking source entity name tokens identified by a source language entity detection and recognition system against a list of target language name tokens that includes source-language-native and non-source-language-native names. For example, an entity name identified by NER in simplified Chinese of a document being translated (and tokenized) may be compared against English language counterparts derived from a corpus of English texts to form a ranking of English entity names as candidate translations, where the entity names may be entity names that were native to English, Chinese, or another language.

Although candidate translations are discussed as being generated by applying the sequence alignment model 234, candidate translations may be generated in accordance with other techniques, or in accordance with a combination of techniques. For example, a first set of candidate translations may be generated by applying the sequence alignment model 234 and a second set of candidate translations may be generated by performing a lookup of a dictionary of source entity name tokens to target language entity name tokens. As another example, candidate translations may be generated by performing character-level transliterations (which, e.g., may provide a number of alternatives).

Candidate translations may be normalized. For example, name components that may be considered optional such as prefixes (e.g., mister or misses), middle names, initials, suffixes (e.g., Jr.), and the like may be removed. In addition to, or alternatively, to removing components of names, names may be normalized according to a phonetic algorithm, such as Soundex, NYSIIS, or Metaphone. For example, an entity name in Arabic script may correspond to a name often spelt as Muhammad in the English language. Applying Soundex to a transliteration may result in M530 and may cover many permutations of the name, such as Muhammad, Muhamad, Mohammad, Muhamed, and the like. Thus, a number of permutations in candidate translations may be reduced. In implementations, a transliteration model (e.g., the sequence alignment model 234) may be trained with pairs of phonetic algorithm results in the target language and their source language counterparts, and use of the transliteration model (with, e.g., source language input) may provide an output of a normalized result in the target language (e.g., to generate candidate translations instead of using normalization to reduce candidate translations after candidates are generated). A database of target language texts (e.g., the database of extracted text 236) may include records that are keyed according to the normalized result and provide a target language counterpart. For example, a key may be M530 and the corresponding record may include that a translation is Mohammad, and that record may further include context information related to target language texts.

As a result of generating candidate translations, the candidate translations may include an accompanying score (e.g., as a result of applying a sequence alignment model). The score may be referred to as an edit distance score, or more particularly, a Perceptron Trained Edit Distance (PTED) score when applying a perceptron-based model as an alignment sequence model. To select a candidate translation to use as a translation, a highest-ranked candidate translation may be selected. For example, in the sample system mentioned above, a candidate English token with a highest ranking may be selected as a translation of each Chinese source name token. In the sample system, a finding was made that whereas the correct translation is commonly among the top-ranked English tokens, it is often not the very top one. For example, for the second token in the string 120 depicted in FIG. 1B (which may represent "Tony Blair," where the second token represents "Blair"), the model may rank English token candidate translations for the second token representing "blair" as follows:

TABLE 1

| Token Translation Candidate | Score |
| --- | --- |
| bril | 27.36 |
| boer | 26.17 |
| blair | 24.72 |
| blail | 24.64 |
| brill | 24.49 |
| boulil | 22.15 |
| butler | 21.77 |

TABLE 1-continued

| Token Translation Candidate | Score |
| --- | --- |
| breyer | 21.60 |
| boolell | 19.80 |
| burrell | 19.77 |

In that table, "Blair" is ranked third. Thus, token ranking may be utilized as input to further processing that utilizes multi-token name and document context, which may be referred to as cross-document co-reference with target language documents.

Cross-document co-reference with target language documents may be applied if there are multiple candidate translations such that a name might be translated several ways and co-reference may involve a determination as to whether any candidate translations (e.g., candidate translations generated according to application of a trained sequence model, a dictionary-based technique, another technique, or a combination of techniques) appear in documents in the target language (see e.g., Yaser Al-Onaizan and Kevin Knight, Translating Named Entities Using Monolingual and Bilingual Resources, ACL (2002), incorporated by reference) and, if so, the most plausible candidate translation may be chosen. Four factors that may be considered in determining the degree of fit may include: edit distance (as described with regards to application of a perceptron model), multi-token names (e.g., based on co-occurrence of terms and token-by-token similarity computation), name frequency in a target language corpus (e.g., frequency in the database of extracted text 236), and document context (e.g., context in a source document to be translated as compared to context of mentions in extracted text from a target language; e.g., temporal contexts being similar, similarity of titles, and the like).

Multi-token names may provide a strong indication of a correct translation. For example, if "Tonny Breyer" and "Tony Blair" are both feasible translations based on edit distance but only the latter appears in an English corpus (e.g., which may be determined by querying a database of extracted text), the latter may be more likely to be correct than the former. The computational complexity for finding all multi-token matches may be $O(N^2)$ in the number of matches to each individual component. If multiple multi-token candidate translations appear in a target language corpus, the more frequent entity names may be considered to be more likely to be correct than the less frequent ones (e.g., based on an assumption that the name occurrence statistics are similar in the source and English corpora). Finally, if a candidate name appears in a target language document published the same year (temporal proximity) as the source document, with the same topic (document classification) as the source document, or with co-occurring names shared by the source document, it may be more likely to be a correct translation.

In an evaluation, a score was engineered combining an edit distance score, name frequency, and temporal proximity for multi-token names with candidate translations in an English corpus and selection of a translation was performed for a highest-ranked candidate based on this score. This selection process was considered to be more accurate than simply selecting a highest ranked edit distance score that is calculated by applying a sequence alignment model. Utilizing additional types of document context to generate a combined score may improve selection accuracy.

A combination of techniques may be used to translate an entity name in combination with the techniques involving comparing contexts of texts across languages. For example, if there is a one to one correspondence between a set of tokens in a source language and target language tokens, the target language tokens may be used as a translation; otherwise, candidate translations may be generated, scores may be generated for the candidate translations based on a combination of factors, and a translation may be selected from the candidate translations.

Once a translation is selected for the longest form of an entity name, the corresponding sub-names may be selected for shorter named mentions of the same entity based on the source language co-reference chain (e.g., once a translation is selected as being George Bush, the shorter named mentions may be translated to Bush).

Although the systems of FIG. 2 are shown with a certain number and types of components, implementations may differ. For example, although not shown, the third system 212 may further include a user interface that may be used by a user to interact with the translation engine 226 (e.g., to select a document to translate). As another example, the third system 212 may further include a machine translation component for text other than entity names in a document and the combination with the entity translation engine 226 may allow for full, accurate translation of documents to a target language. As another example, the system may support multiple target and source languages such that there may be multiple databases of extracted text (e.g., one for each target language), multiple types of tokenizers, multiple sequence alignment models (e.g., one for each combination of source and target languages), and the like.

Figure 3:
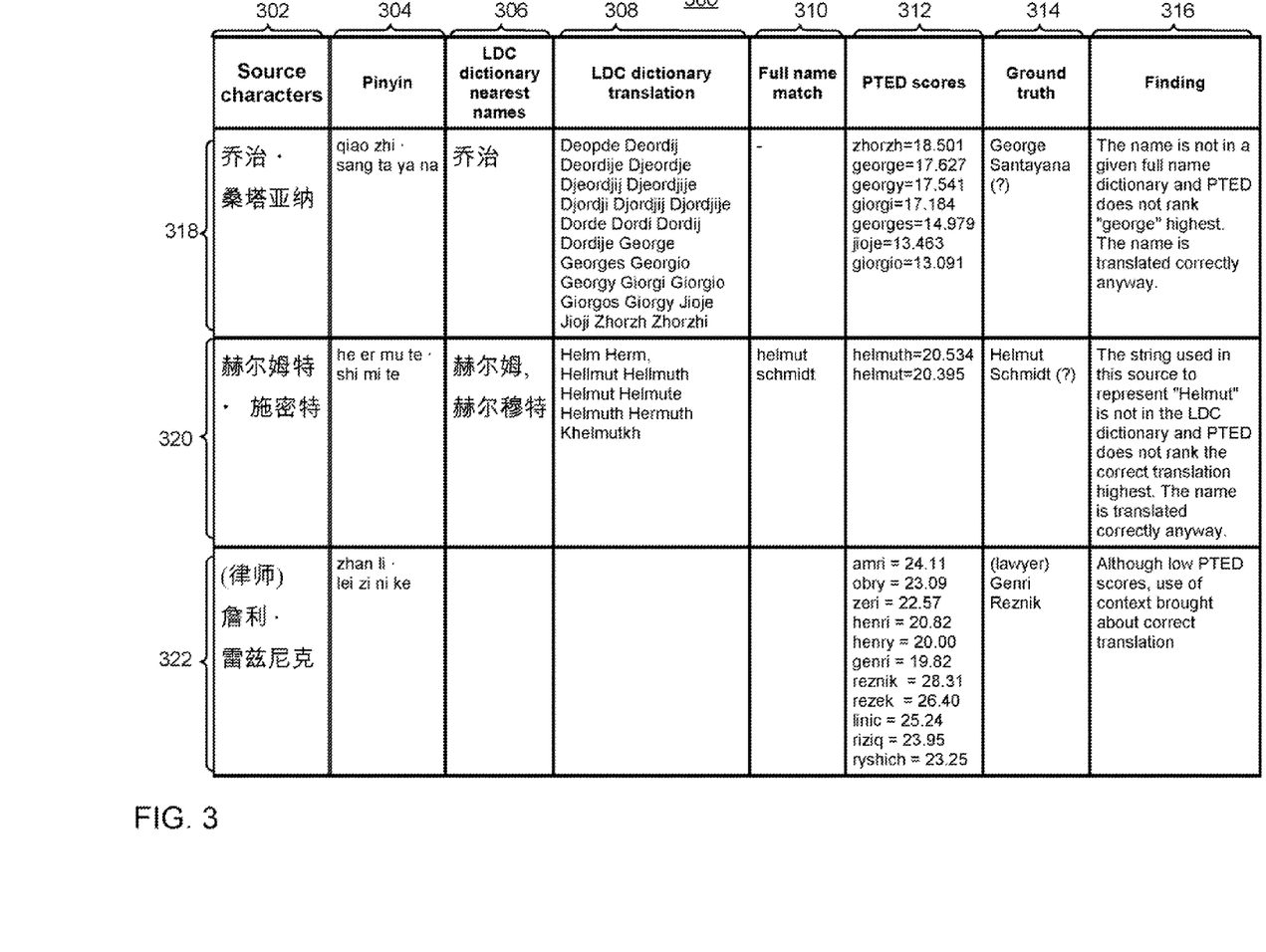
FIG. 3 is a table including entity names in a source language and target language, and findings based on a translation of entity names.

FIG. 3 is a table 300 including entity names in a source language and target language, and findings based on a translation of entity names. The table further includes similar LINGUISTIC DATA CONSORTIUM (LDC) dictionary names and their translations. Each of the first, second, and third rows 318, 320, 322 corresponds to a sample of Chinese text that was translated to English according to the example techniques described above. A first column 302 includes source characters, a second column 304 includes their Pinyin counterparts, a third column 306 includes LDC dictionary names that have a closest resemblance to the source character names of the first column 302, a fourth column 308 includes translations based on the LDC dictionary, a fifth column 310 indicates whether there was a full match in the LDC dictionary, a sixth column 312 includes PTED scores of terms according to their Pinyin counterparts, a seventh column 314 includes a desired translation (e.g., an English entity name associated with the underlying entity), and an eighth column 316 including findings based on application of an implementation with the source characters of the first column 302.

For example, the first row 318 includes two strings of characters (which are two tokens) in the Chinese language that may be transliterated to the Pinyin "qiao zhi" and "sang ta ya na" (e.g., based on a tokenization that divides strings of characters at a dot marker in-between characters). For the first string of characters that has the Pinyin "qiao zhi" an LDC counterpart to that string is located in the third column 306, which has the same script representation. The LDC counterpart translates into any of the possibilities shown in the fourth column 308, including deopde, deordij, george, georges, georgio, and the like. The fifth column 310 has an empty cell to represent the LDC dictionary does not have a full match for both tokens in the entity name. The PTED scores for candidate translations of the first token (where the candidates may be generated based on the averaged perceptron model, the LDC dictionary translations, or both) are shown in the sixth column 312, including a high score of about 18.5 for zhorzh and a second highest score of about 17.6 for george. The seventh column 214 indicates that the English entity name should be George Santayana. Based on a test, a finding was made, as indicated in the eighth column 316, that a correct translation was made to George Santayana although a top-ranked PTED scored candidate translation was not an accurate match and there was no full dictionary match for both tokens in the entity name (e.g., the combination of tokens may have frequently occurred in an English corpus resulting in a determination to use the particular candidate translations).

The second example shown in the second row 320 includes a finding that although there was not a dictionary match for the source language characters of a first token and the closest first token matches did not have a highest PTED score, there was a full match for both source tokens which resulted in an accurate translation.

The third example shown in the third row 322 includes a finding that a title of an entity name, where the title was associated with the entity name due to its adjacency to the entity name in the source text (and associated with the target entity name), helped find a match among candidate translations, where an accurate translation of a first token had a sixth-highest ranking PTED score.

Figure 4:
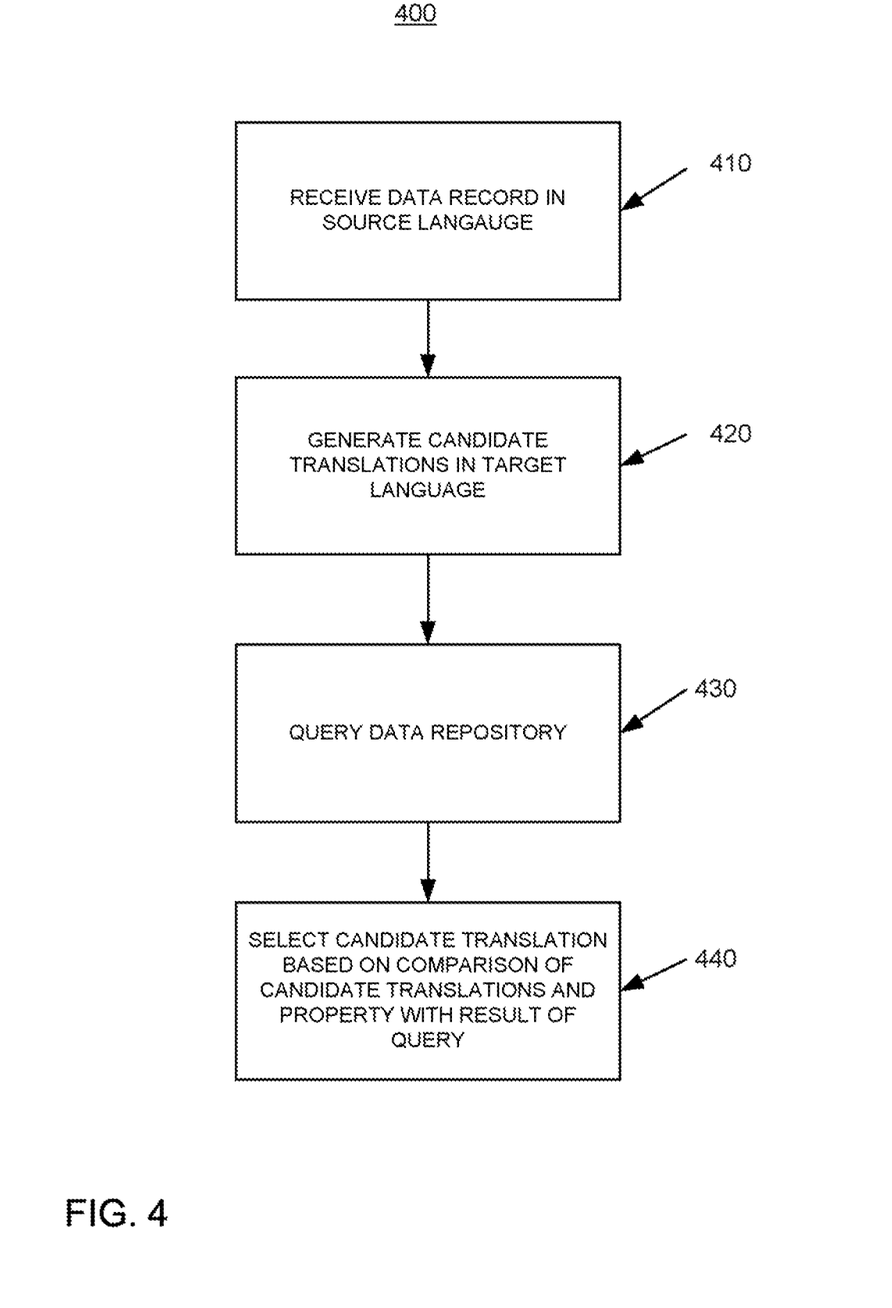
FIG. 4 is a flowchart illustrating a process to select a candidate translation based on a comparison with records from a data repository.

FIG. 4 is a flowchart illustrating a process 400 to select a candidate translation based on a comparison with records from a data repository. The process 400 may be implemented in the third system 212 of FIG. 2 or another system. In general, the process 400 involves receiving one or more data records in a source language (410), generating candidate translations in a target language (420), querying a data repository (430), and selecting a candidate translation based on a comparison of candidate translations and a property with a result of the query (440).

Receiving data records in a source language (410) may involve receiving one or more data records, where each of the data records may include one or more names of one or more entities in a source language from a document in the source language to be translated to a target language. The names in the data records may be tokenized. There may be one or more tokens. A source and target language may differ by having different orthographies, which may include different scripts. Different orthographies may include a substantial amount of overlapping characters. For example, both the Finnish and English orthographies have a substantial amount of overlapping characters. The receiving may involve passing of tokens from one function to another (e.g., receiving a record as an argument to a function or part of an application programming interface call). As an example, a set of two data records that are received may include a first data record with the entity names Bill, Bill Clinton, Billary, Clinton, and William Jefferson Clinton and a second data record with the entity names Hillary, Hillary Clinton, Billary, and Clinton. Multiple instances of a name in a record may represent multiple occurrences of names in a source document that are expected to represent a same or similar entity. A set of records may be one or more records. Although records may be records in the sense of database records, the word need not be so limited (e.g., records may be in a form of storage other than a database record (e.g., a simple, scalar variable or a composite variable)). A record with names in the source language may include context items of a source document or documents, such as: titles, co-occurring entity names (e.g., first and last name), co-occurring terms (e.g., terms that occur adjacent to or otherwise near a term), relations, dates or date ranges mentioned in the documents, creation or publication dates of the documents, document topics, and document classification.

Candidate translations are generated in a target language (420). The candidate translations may include a set of candidate translations for each data record. Candidate translations may be speculative translations of a token or tokens from the source language to one or more tokens in the target language. The candidate translations may be candidates in the sense that they need not represent a translation that has yet been deemed to be a translation that is most accurate. Any number and type of techniques may be used to generate candidate translations. For example, a sequence alignment model may be applied to a transliteration of received tokens from the sub-process of 410 to generate multiple candidate translations (e.g., a first ten candidate translations having highest rankings of affinity).

A data repository is queried (430). The data repository may be a database or other type of data repository (e.g., a hash table). The data repository may include records that include extracted text from a target language corpus, including one or more entity names and associated properties, such as a co-occurring terms or entity names, titles, relations, topics, temporal indications (e.g., dates or date ranges mentioned in the documents, and creation or publication dates of the documents), document topics or document classification, and the like. The data repository may be queried for properties associated with a candidate translation, if any. For example, if there are two tokens in a recognized entity name, where there are N candidate translations of the first token and M candidate translations of the second token, there may be N×M possible combinations and a data repository may be queried for each of those combinations. For example, if a first token has the candidate translations genri and henry, and a second token has candidate translations lesnik and reznik, the combinations genri lesnik, genri reznik, henry lesnik, and henry reznik may each be used to query a data repository for records corresponding to each possible entry in the data repository. The absence or existence of a record may be used in the next sub-process as a factor to use when selecting a candidate translation. In implementations, multiple data repositories may be queried. For example, there may be a data repository for source language documents, target language documents, and the data records to include entity names.

The data repository may include use of normalized keys (e.g., generated based on Soundex, NYSIIS, or Metaphone). Querying the data repository may include the use of exact matching without normalization, normalized matching (e.g., exact matching of normalized candidate translations and normalized target language names), or some combination of techniques. Token-by-token similarity analysis may be used to find wholly or partially matching records in the data repository (e.g., if a candidate has three names and an entry has two names, a token-by-token analysis may determine that the set of two names matches two of the three names in the candidate such that the record is to be returned as a result).

A candidate translation is selected based on a comparison of candidate translations and a property with a result of the query (440). In general, one or more properties of a candidate translation (e.g., based on data extraction from a source document) and one or more properties resulting from the query may be used to assist with selection of a candidate translation. For example, if a record exists in the data repository for only one candidate translation (or combination of tokens corresponding to a candidate translation), the existence of that record and the absence of records for other candidate translations may be used to determine that candidate translation having a record should be selected as a translation. This may be accurate as the data repository may include records reflecting extracted entity names from a corpus of target language documents such that the lack of records for any of the other candidate translations may reflect those names are not recognized in the target language. The existence or absence of records may be one of many factors used in determining a candidate translation to select. For example, there may be a scoring system based on a combination of factors that may be used to determine a best candidate translation. A combination of factors may include similarity of a candidate translation and a target language name (e.g., a target language name in a data repository that is extracted from a target language corpus and is used for a lookup (e.g., a target language name that is associated with a normalized lookup value)); similarity of sets of target language context items and candidate translations of source language context items; and document frequency of the target language name (in a set of target language corpus). A similarity of a candidate translation and a target language name may discount missing name components that are optional (e.g., prefixes, middle initials, and suffixes) and measure similarity token-by-token. A similarity of sets of target language context items and candidate translations of source language context items may utilize a weight of evidence of each context item that is computed from statistics of the source and target language data records. Token-by-token similarity may be based on character-level transliteration, based on a transliteration model, based on look-up in a translation table, or based on matching of abbreviations against long forms of names. Token-by-token similarity calculations may be reused from token-by-token similarity calculations generated to perform a lookup at the data repository of the target language corpus.

To perform a comparison of candidate translations and one or more properties with one or more results of the query, in addition to using a result of a query of a target language corpus (e.g., from the sub-process of 430), a source language document to be translated may be evaluated for properties to compare to that result. For example, a source language document may be translated to identify that a title of "river" is located near an entity name that has candidate translations of gnile and nile, and that may be compared against query results for gnile and nile to determine that the candidate translation nile should be chosen based on a result including the title river which matches the title of the source document.

Although the process 400 of FIG. 4 includes a certain number and type of sub-processes, implementations may differ. For example, the process may further include receiving a document in a source language, performing NER to find strings representing entity names, and tokenizing the strings (into one or more tokenizations, each of which may have one or more tokens) to generate source language tokens.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A method for implementation by one or more data processors and comprising:
    receiving, by at least one data processor, a set of data records the data records comprising one or more names of one or more entities in a source language from a source document;
    generating, by at least one data processor, candidate translations for the names of the data records, the candidate translations being strings of characters in a target language that has a different character set than a character set of the source language;
    querying, by at least one data processor, a data repository for records matching the candidate translations;
    and selecting, by at least one data processor, a translation of at least one of the names from the candidate translations based on a comparison of the candidate translations and properties of the source document with the result of the querying the data repository, the properties comprising of co-occurrence of terms in the source document, date of publication of the source document, a first frequency of the names of the data records in the source document, and a second frequency of the names of the data records in documents published since a particular date.

2. The method of claim 1, wherein the generating the candidate translations comprises determining, by at least one data processor, the candidate translations based on character-level transliteration, based on a transliteration model, or based on look-up in a translation table.

3. The method of claim 2, wherein the transliteration model is trained in a supervised fashion on a set of corresponding transliterated string pairs from the source and target languages.

4. The method of claim 3, wherein the transliteration model is a character sequence alignment model based on at least one of a voted perceptron, a kernel method, and a hidden Markov model.

5. The method of claim 2, wherein the determining the candidate translations is performed by treating, by at least one data processor, each combination of characters determined to represent an entity name as a single string of characters.

6. The method of claim 2, wherein the determining the candidate translations comprises tokenizing, by at least one data processor, a combination of characters determined to represent an entity name into multiple consecutive strings of characters such that each token corresponds to a word or name component in the target language.

7. The method of claim 2, wherein the determining the candidate translations comprises considering a plurality of possible tokenizations of a combination of characters determined to represent an entity name.

8. The method of claim 2, wherein the candidate translations are in a normalized form of the target language.

9. The method of claim 1, wherein the set of data records is obtained by performing, by at least one data processor, information extraction comprising named entity recognition on a set of source language documents.

10. The method of claim 9, wherein the set of data records comprise one record per a distinct entity name in each of the source language documents.

11. The method of claim 9, wherein the set of data records comprise one record per distinct entity per document as a result of within-document co-reference resolution.

12. The method of claim 9, wherein the set of data records comprise one record per distinct entity found in the set of source language documents as a result of cross-document entity disambiguation.

13. The method of claim 1, wherein the data repository is generated by performing, by at least one data processor, information extraction comprising named entity recognition on a set of documents in the target language.

14. The method of claim 13, wherein one data repository record of the data repository is generated per one distinct entity name.

15. The method of claim 13, wherein one data repository record of the data repository is generated per one distinct entity found in the set of documents in the target language based on cross-document entity disambiguation.

16. The method of claim 1, wherein the entities comprise a person, a location, and an organization.

17. A non-transitory computer program product storing instructions to cause a data processing apparatus to perform operations comprising:
    receiving a set of data records the data records comprising one or more names of one or more entities in a source language from a source document;
    generating candidate translations for the names of the data records, the candidate translations being strings of characters in a target language that has a different character set than a character set of the source language;
    querying a data repository for records matching the candidate translations;
    and selecting a translation of at least one of the names from the candidate translations based on a comparison of a combination of the candidate translations and properties of the source document with the result of the querying the data repository, the properties comprising of co-occurrence frequency of one or more co-occurring terms in the source document, date of publication of the source document, a first frequency of the names of the data records in the source document, a second frequency of the names of the data records in documents published since a particular date, and cultural conventions associated with the source language and the target language.

18. The product of claim 17, wherein the set of data records is obtained by performing information extraction comprising named entity recognition on a set of source language documents.

19. The product of claim 17 wherein the generating of the candidate translations comprises considering a plurality of possible tokenizations of a combination of characters determined to represent an entity name.

20. A method for implementation by one or more data processors comprising:
    receiving, by at least one data processor, one or more tokens generated from a source document in a source language, the tokens being atomic words in the source language;
    generating, by at least one data processor, one or more candidate translations for the tokens, the candidate translations being strings of characters in a target language that has a different character set than a character set of the source language, the generating the candidate translations comprising applying a trained sequence alignment model to a transliteration of one or more of the tokens to generate at least some of the candidate translations;

querying, by at least one data processor, a data repository for records matching the candidate translations, the records comprising properties of terms in the target language, the properties of the terms derived from an extraction of the terms from documents in the target language;

and selecting, by at least one data processor, one of the candidate translations as a translation of the one or more tokens based on a comparison of the candidate translations and properties of the source document with the result of the querying the data repository, the properties comprising of two or more of co-occurrence of terms in the source document, date of publication of the source document, a first frequency of the names of the data records in the source document, and a second frequency of the names of the data records in documents published since a particular date.

* * * * *